Figure 1:
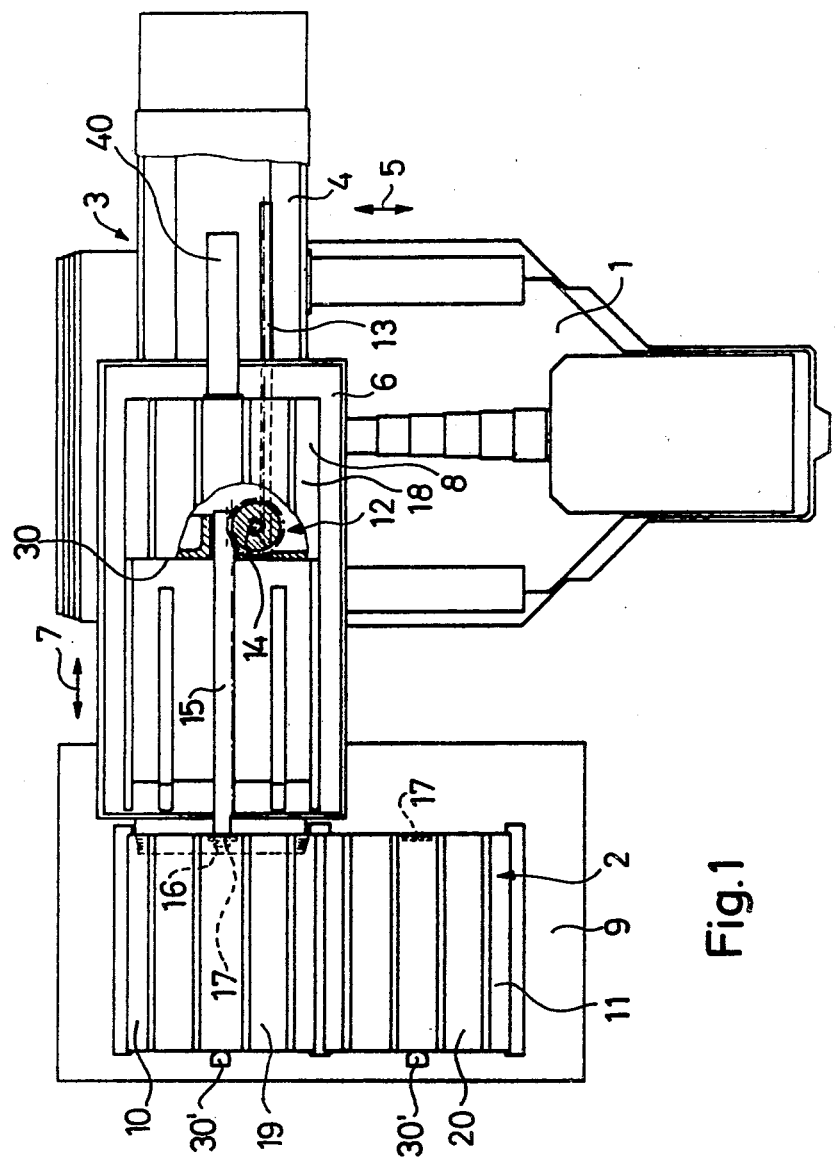

United States Patent [19]

Stark et al.

[11] Patent Number: 4,460,081
[45] Date of Patent: Jul. 17, 1984

[54] MACHINE ASSEMBLY COMPRISING A MACHINE TOOL AND MEANS FEEDING WORK THERETO

[75] Inventors: Gerhard Stark, Beethovenstrasse 21, 7312 Notzingen; Günther Blum, Ravensburg, both of Fed. Rep. of Germany

[73] Assignee: Gerhard Stark, Notzingen, Fed. Rep. of Germany

[21] Appl. No.: 332,354

[22] Filed: Dec. 18, 1981

[30] Foreign Application Priority Data

Jan. 21, 1981 [DE] Fed. Rep. of Germany ....... 3101765

[51] Int. Cl.$^3$ ............................................. B65G 43/00
[52] U.S. Cl. ..................................... 198/341; 198/345
[58] Field of Search ............... 198/345, 339, 341, 472; 29/33 P, 563; 414/750

[56] References Cited

U.S. PATENT DOCUMENTS

| 4,014,428 | 3/1977 | Ossbahr | 198/345 |
| 4,172,512 | 10/1979 | Clegg et al. | 29/33 P |
| 4,373,840 | 2/1983 | Miller, Jr. | 198/339 |

FOREIGN PATENT DOCUMENTS

| 3025797 | 7/1980 | Fed. Rep. of Germany . |
| 56-134161 | 10/1981 | Japan | 29/33 P |

Primary Examiner—Joseph E. Valenza
Assistant Examiner—Kyle E. Shane
Attorney, Agent, or Firm—Michael J. Striker

[57] ABSTRACT

A machine assembly comprises a machine tool including a machining table with a base table drivable in the Y-direction and a co-ordinating table movable under an NC-control system on the base table in the X-direction with a base table part secured to the co-ordinating table, and the work feed device including pallets movable from a base frame on to this base table part or the co-ordinating table under the positive direction of the controlled movement of the base table itself relatively to the co-ordinating table, thereby dispensing with a special device for operating a pallet change, wherein at least two pallets along with the base table part, form a machine surface.

11 Claims, 9 Drawing Figures

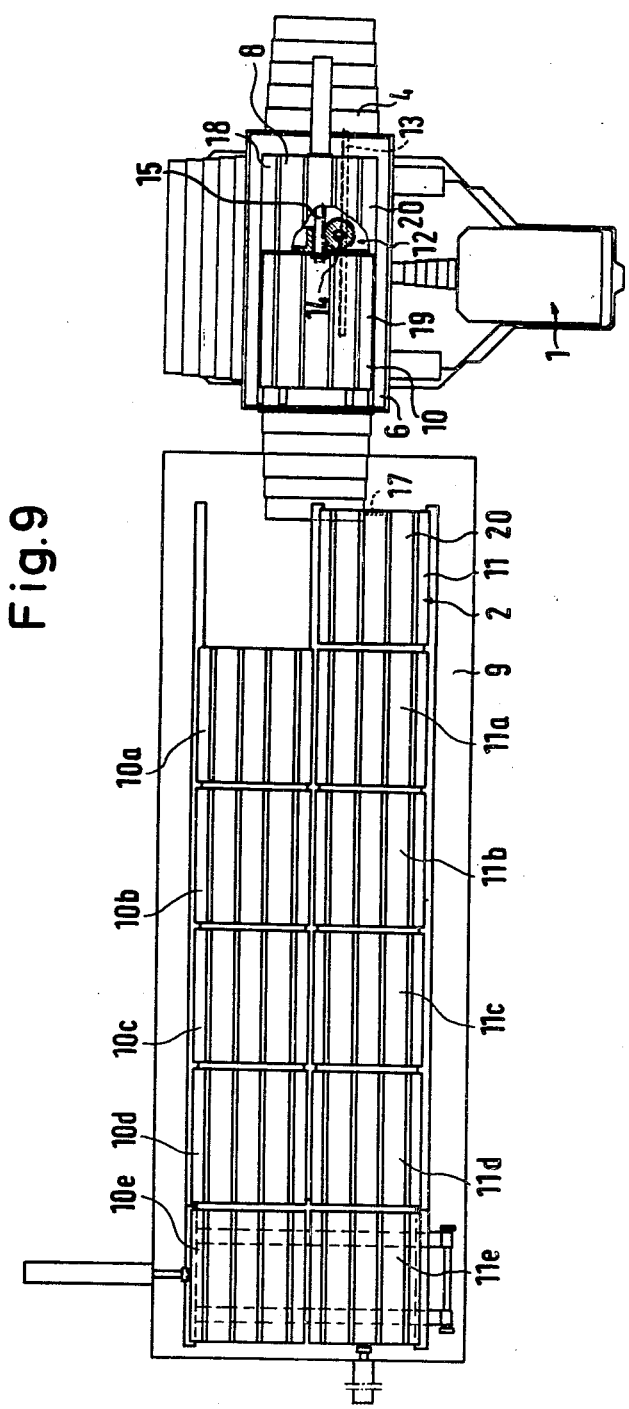

MACHINE ASSEMBLY COMPRISING A MACHINE TOOL AND MEANS FEEDING WORK THERETO

The invention relates to a machine assembly comprising a machine tool and means for feeding work to this tool, the machine tool comprising a base table which can travel in the Y-direction and a co-ordinating table which can be moved on the base table in the X-direction, these both being governed by an NC-control system.

In a known machine (DE-AS 2320370) in this field a working table is located on the co-ordinating table, this working table cooperating with a working table on a pallet carrier. A workpiece on one working table is machined whilst the pallet carrier is loaded at this time with a fresh workpiece to be machined. Thereafter the working table with the machined workpiece is pushed on to the pallet carrier, the carrier is turned through 180°, and the working table is brought to the machine tool with the fresh workpiece. The two working tables are used independently, the changeover as a rule requires independent drives, and a certain amount of operating time is consumed. In a particular form of construction the beds of the machines are combined into an integral construction, in which case a machining table and the interchangeable working table carriers are moved by the operation of an X-axis driving motor relatively in opposite directions in very close rectilinear proximity. Thus the working table with the machined workpiece is moved to the pallet carrier by the X-axis drive of the machine. After this however the pallet carrier has to be turned through 180° by its independent motive means, which entails considerable technical expense for pallet operation and relatively large tolerances have to be accepted.

An object of the present invention is to provide a machine assembly in which use can be made of an enlarged machining table which will accommodate larger workpieces.

Another object is an assembly in which a workpiece can be selectively machined on one pallet and during the machining period a workpiece can be loaded on the other pallet.

A further object is to provide an arrangement in which a rapid machining period can be achieved with reduced dead time.

A fourth object is an arrangement in which the drive of the pallets is greatly simplified and readily controlled.

In pursuance of these objects the present invention provides an arrangement in which a part of the base table is arranged on the co-ordinating table and work feeding means in the form of pallets are provided on a base frame adjacent said machine tool and are movable to and from said base frame on to and from said base table part or said co-ordinating table in correlation with the movement of the base table relatively to the co-ordinating table, and wherein at least two said pallets are provided and have surfaces which, together with the surface of said base table part, form machining surfaces and at least the machining surfaces of the pallets are iniplanar. Thus the X-axis driving means and the Y-axis driving means of the machine tool are used to perform the pallet-changing function so that no special drive means is required for this.

In accordance with a further feature of the invention said base table, said co-ordinating table with the base table part and one of the pallets are connected to one another selectively by the NC-control system through a positive drive gear. Thus it is not necessary to provide, bring in, and control an independent drive. Advantageously a controlled movement of the co-ordinating table produces a positive movement, through the positive drive gear, of one of the pallets, the movements of the pallet relatively to the co-ordinating table being opposite to the movement of the base table relative to the co-ordinating table.

Advantageously to balance tolerances and to simplify the control the displacement travel, and thus also the speed of displacement, of the pallet relatively to the co-ordinating table is devised so as to be greater than the displacement travel and the rate of displacement of the co-ordinating table relatively of the base table. The conversion so provided enables even greater spacings to be bridged over without substantial enlargement of the length of construction being obligatory. Despite this, exact limit positioning can be achieved, without making too great a demand on the accuracy of the controls, by using a safety clutch.

With particular advantage the positive drive gear comprises a rack fixed on said base table, a pinion mounted in said co-ordinating table and meshing in said rack, a transporting guide bar, a toothed wheel operatively connected to said pinion, and a clutch meshing with said guide bar and connected to said pinion. The transporting guide bar can be fixed in one of the pallets and be movable in the X-direction relatively to the co-ordinating table.

In accordance with a feature of the invention the rack and the pinion are connected through a clutch, preferably a magnetic clutch. For selective connection the transporting rack is provided at the end thereof facing the pallets with a guideway which can be pushed into or withdrawn from a projection of a pallet during the movement of the co-ordinating table in the Y-direction.

To prevent any damage resulting from contamination by shavings or the like, the base table part may be provided at the end thereof facing the oncoming pallets with an abutment which, should the approach be insufficient, will shut off the machine through a press switch.

To accelerate the movement of the pallets and to reduce the length of the structure, the positive drive gear is arranged to operate through a conversion such that the path of travel of the transporting rack is more than that of the rack itself.

The invention is not limited in scope to a two-pallet construction. Thus for example the means for feeding work to said machine tool may comprise a circulating track accommodating a multiplicity of replaceable pallets, means for moving pallets stepwise along said track, and means for selectively removing pallets loaded with unfinished workpieces from said track, and returning pallets loaded with finished machined workpieces to said track.

A further possibility lies in the case of larger and wider pallets where the Y-travel may not be sufficient to allow for moving the base table in the Y-direction. In this event in the Y-direction the same rack and the same pinion can be used to reduce distance of travel appropriately to the wider pallets. A rack must thus be fastened on the co-ordinating table in the Y-direction to drive, during the Y-movement, a pinion on the spindle of which is mounted a toothed wheel with a transmission ratio (e.g. 1:2), which drives the two pallets through a second rack. The Y-rack would here bear against the outer righthand corner of the co-ordinating table.

On the other hand the Y-racks could be located in an appropriate position within the co-ordinating table in place of the X-racks. In this way the two pallets could be arranged directly in front of the co-ordinating table which, in many instances, would help the operator to supervise the machine. With this construction therefore, using a minimum of paths of co-ordination travel needed by the machine tool, even larger pallets can be changed and this, by virtue of the programmisable regulatability of the X-drive and the Y-drive, at a maximum speed related to the masses to be moved. With the arrangement of the pallets described in front of the machine tool, or selectively at the right or lefthand side of the tool, the machine tool can be flexibly adapted to many varying machining systems with particular advantage. Naturally the X- and Y-directions can be interchanged if this is thought necessary to allow for adaption to the prevailing flow of material, and this in simple fashion and without creating much outlay.

The pallets actually used on the co-ordinating table may be hydraulic, for example equipped with a simple and inexpensive hydraulic clamping means and a small high pressure hydraulic unit. A mini high-pressure unit could be installed in the table to avoid expensive immovable hydraulic conduitry.

What is decisive is that all the movements shall occur from the NC-controlled axes X and Y. The speed- and bearing-regulating circuit of these axes, always present in the machine, allow for optimum adaption to the dynamic requirements in the pallet movement (slow motion), crawling, skipping, and the like). Thus for example a pallet carrying a workpiece and clamping means of small weight can be changed under the NC-program more quickly than a heavy pallet. The usual sub-programming techniques which are usual today with NC-controls enable a call for pallet change to be programmed in as a short address. The capacity required for this in the program storage is negligible with the dimensions of modern storage units.

Figure 2:
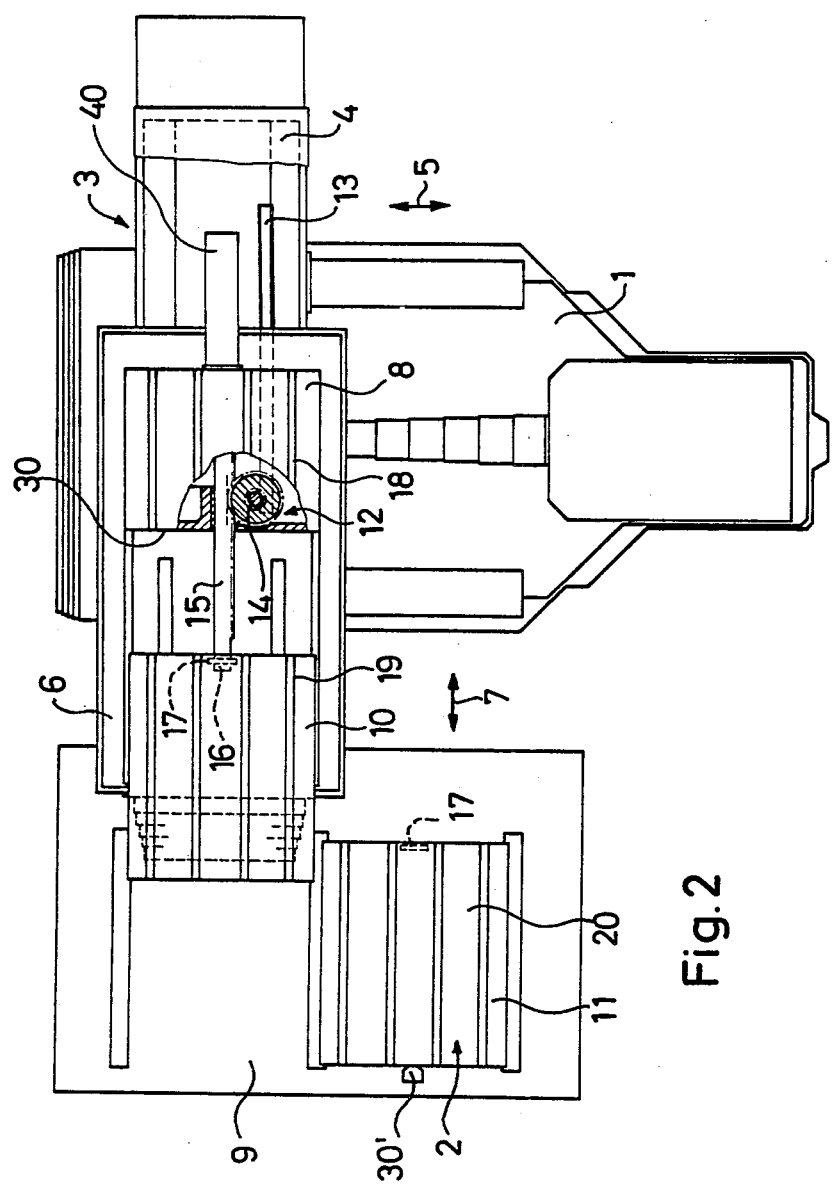
Figure 3:
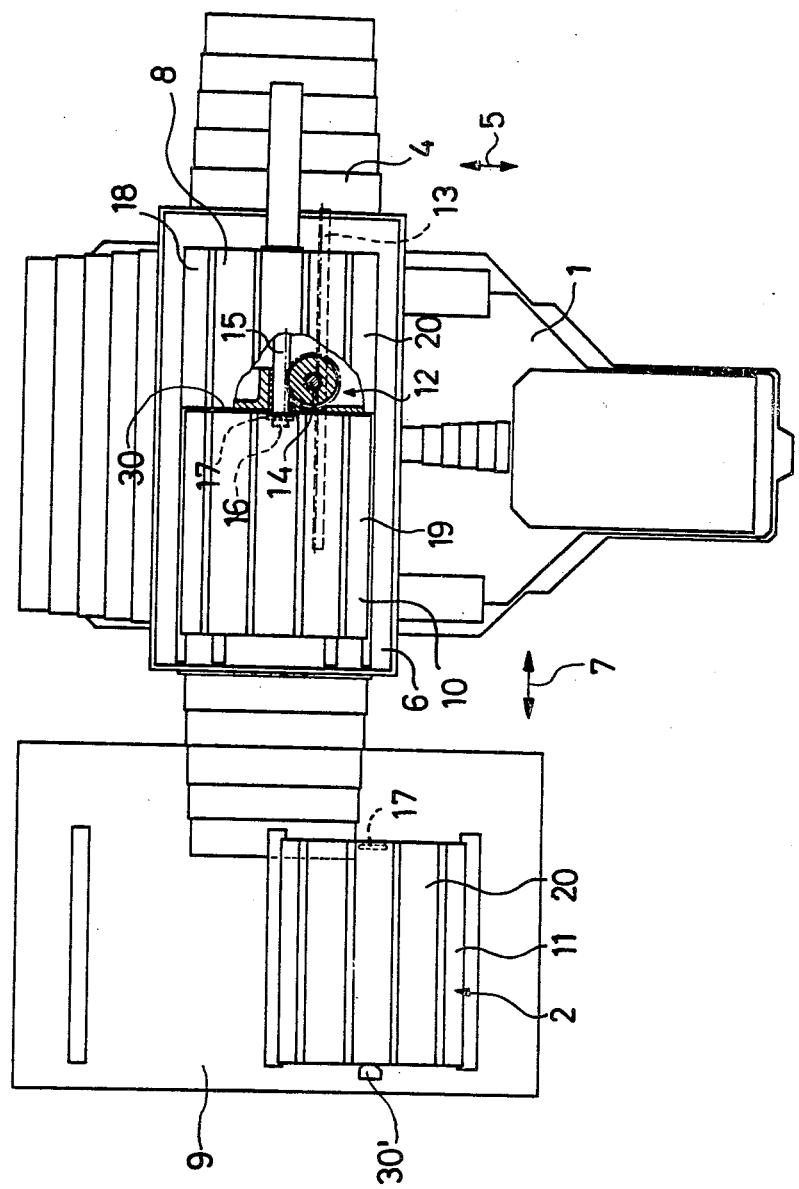
Figure 4:
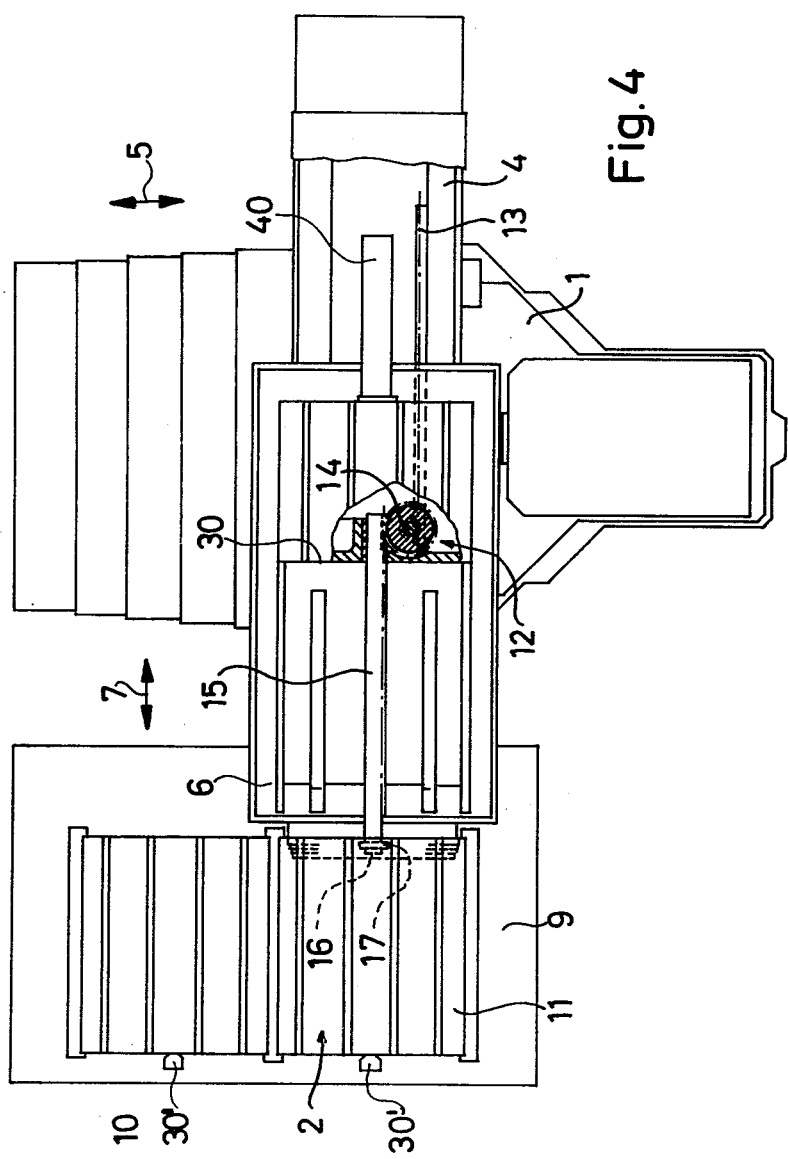
Figure 5:
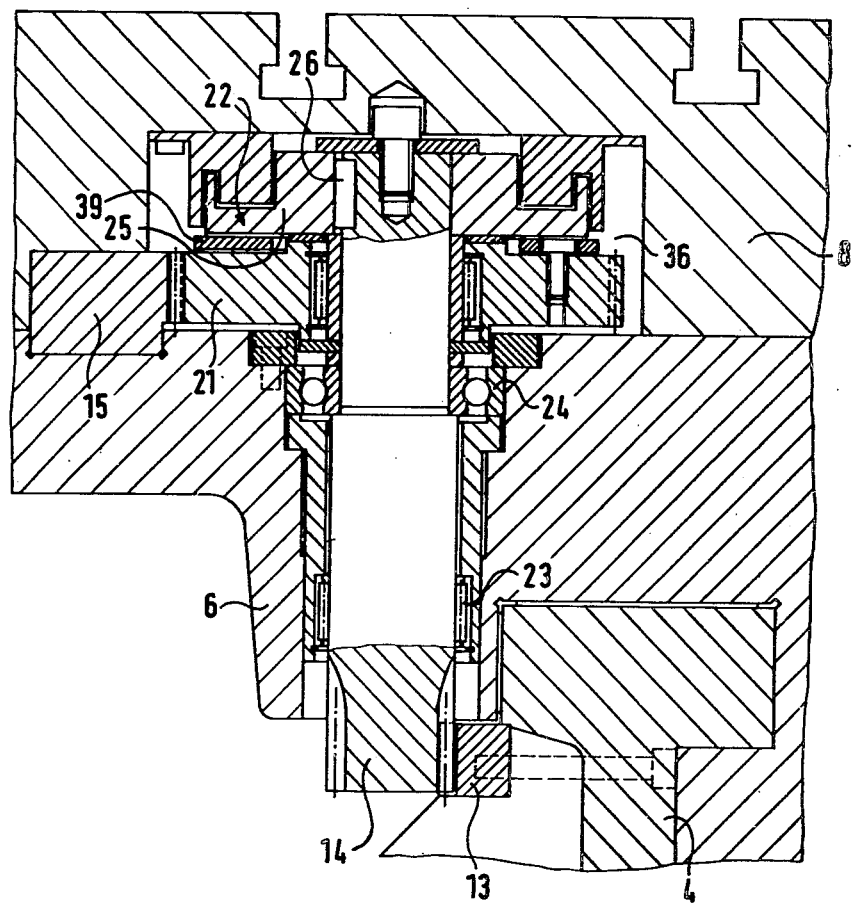
Figure 6:
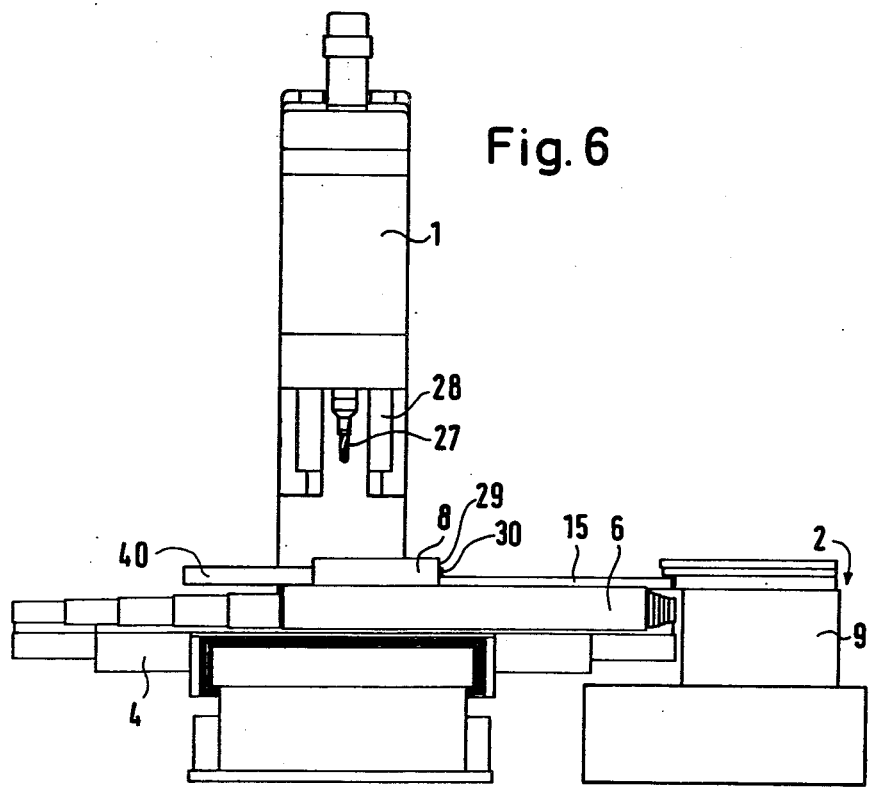
Figure 7:
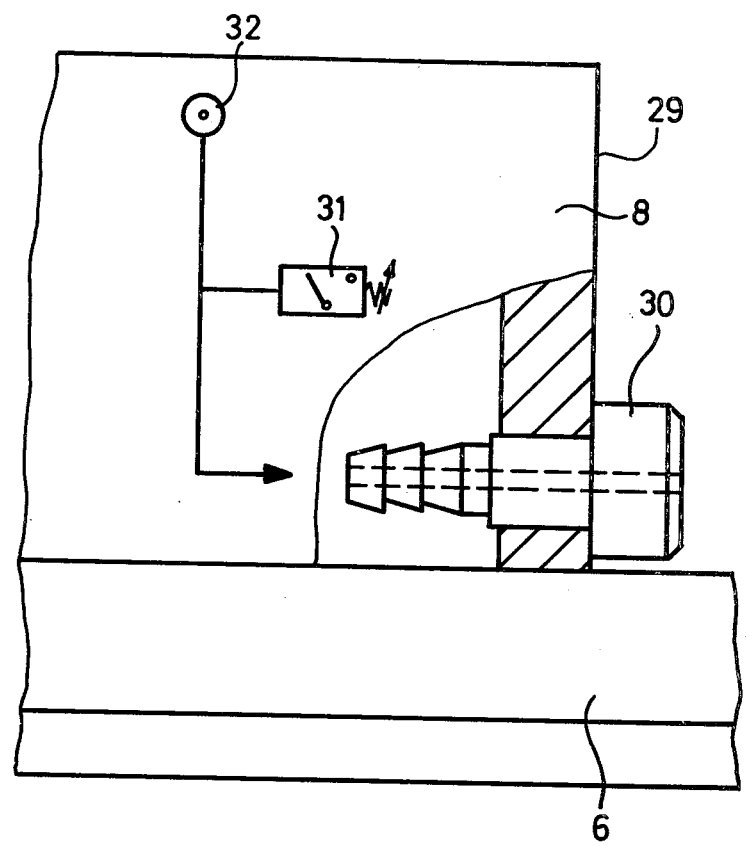
Figure 8:
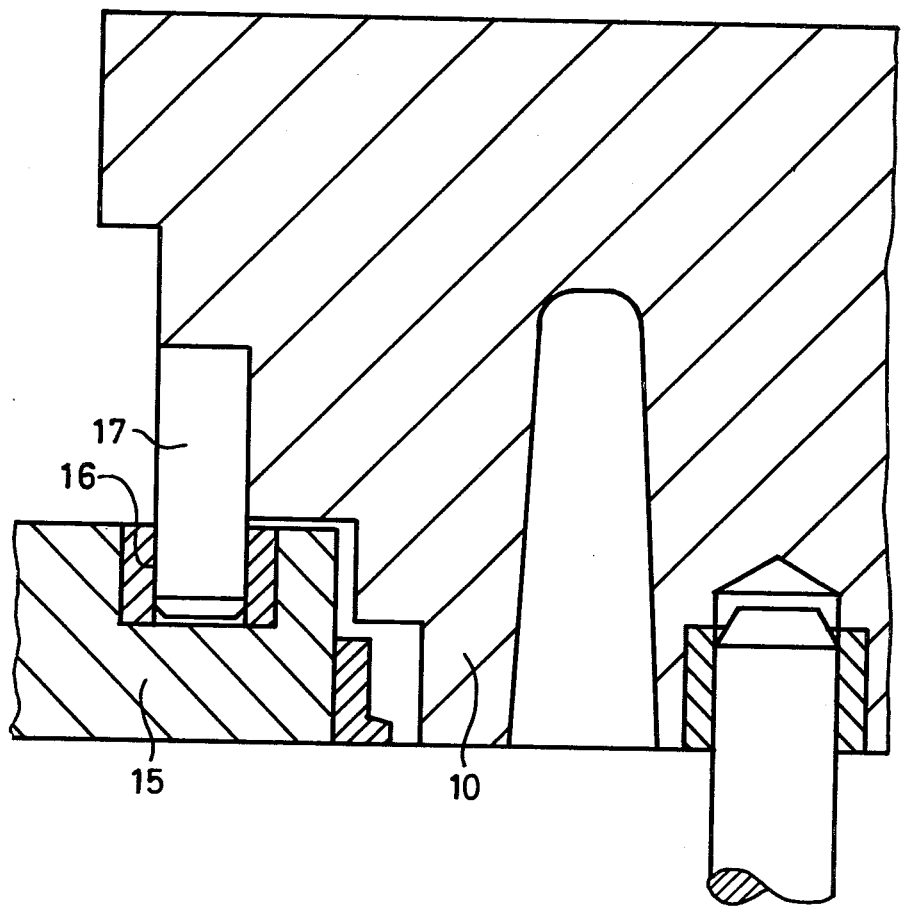

Embodiments of the invention are illustrated in the accompanying drawings in which:

FIG. 1 is a plan of a machine assembly comprising a machine tool and a base frame, having two pallets thereon, one pallet carrying a machined workpiece and having been pushed on to the base frame, and the other pallet carrying a rough workpiece ready for reception on a co-ordinating table, FIG. 2 is a plan of the assembly in a position in which the co-ordinating table has moved to some degree in the X-direction, FIG. 3 is a plan of the machine assembly in which the working position has been reached and the pallet with the rough workpiece has practically made abutment against a base table part, FIG. 4 is a plan of the machine assembly with a pallet carrying a finished workpiece pushed on to the base frame and a pallet with a rough workpiece in the reception position, FIG. 5 is a section through a positive drive gear of the assembly, shown on an enlarged scale, FIG. 6 is a view of the machine tool with the pallet-changing means, FIG. 7 is an enlarged showing of a detail of the base table, FIG. 8 is an enlarged section through a part of a pallet with a part of a transporting rack used in the pallet-changing means, and FIG. 9 is a plan of a machining assembly with a magazine for receiving a plurality of pallets.

The machine assembly illustrated is composed of a machine tool 1 and a workpiece feed means 2. The machine tool comprises a machining table 3 made up of a number of parts, including a base table 4 which is movable in the Y-direction 5 (shown with a double arrow), and a co-ordinating table 6 which is displaceable on the base table 4 in the X-direction 7. The directions 5, 7 are at right angles to one another and together are subject to a NC-control system. Fixedly mounted on the co-ordinating table 6 is a base table part 8, that is to say it moves in the same way as the co-ordinating table 6.

In the embodiment illustrated the workpiece feed means 2 comprises a base frame 9 mounted adjacent the machine tool 1. This frame 9 carries two side-by-side pallets 10, 11 disposed one behind the other in the Y-direction 5. The pallets 10, 11 are of about the same width as the base table part 8, but their individual lengths are somewhat greater than that of the base table part 8, suchwise that the base table part 8, and a pallet 10 or 11 approximately fully occupy the co-ordinating table 6 up to a peripheral frame on the latter.

In the situation illustrated in FIG. 1 the pallet 11 has been pushed on to the base frame 9 to overlap the co-ordinating table 6 which, shortly before, has assumed the upper position with the pallet 11, the workpiece on the pallet 11 having been machined by the machine tool 1. The pallet 10 which is disposed in the position illustrated on the base frame 9 is loaded with a rough workpiece, that is to say with a workpiece which is to be brought at the next change on to the co-ordinating table 6 and then machined.

A NC-control system is used for correlated movement of the base table 4, the co-ordinating table 6 and the pallets 10, 11, a positive drive gear 12 being brought into action for this purpose. This drive comprises a rack 13 which is firmly connected to the base table 4, a pinion 14, a transporting guide bar 15, a guide 16 located at the end of the bar 15, and a guide dog 17 on each of the pallets 10, 11. The surfaces of the base table part 8 and the two pallets 10, 11 represent base machining surfaces 18, 19. 20 which, in the example illustrated, are uniplanar; they carry T-grooves of like form so that the workpieces can be clamped thereon in like fashion.

In the illustration of FIG. 2 the pallet 11 with the machined workpiece is in the same position as in FIG. 1, but the pallet 10 has been pulled partly off the base frame 9 and brought on to the co-ordinating table 6 over the positive drive gear 12.

FIG. 3 reproduces the situation of the machining assembly in which, in addition to the base table part 8, the pallet 10 has been brought over the co-ordinating table 6. The clamped workpieces can be machined in common by the appropriate tool. The pallet 10 may first still remain in its original position, but the finished machined workpiece can already be withdrawn and replaced by a fresh rough workpiece. The co-ordinating table 6 is so moved in the Y-direction 5 and in the X-direction 7 by the NC-control system that the positioned machining can take place.

The illustration of FIG. 4 is similar to that of FIG. 1. Here the workpiece is machined and the workpiece on pallet 10 is moved over the co-ordinating table 6 on to the base frame 2. Prior to this the pallet 11 is loaded with a fresh workpiece to be machined. The co-ordinating table 6 is driven in the X-direction 7 and the Y-direction 5 into the guide 16 of the loaded pallet 11 and thus stands ready to pull the pallet 11 with a movement in the X+-direction with the aid of the transporting guide bar 15. The positive drive gear 12 is in a position corresponding to that of FIG. 1.

The positive drive gear 12 is illustrated in greater detail and on a larger scale in FIG. 5. It will readily be perceived that the pinion 14 is mounted in roller bearings 23, 24 in the co-ordinating table 6. The rack 13 is held fixed in the base table 4 and meshes with the pinion 14. The transporting guide bar 15 is movable relatively to the co-ordinating table 6 and to the base table part 8. The rack 13 and the transporting guide bar 15 are connected through a toothed wheel 21 and a clutch 22. This clutch 22 is an electromagnetic clutch which has a drive plate 25 and is connected continuously with the shaft of pinion 14 by a key 26. Depending on the flexibility required in the construction or operation the drive plate 25 may constitute a unitary construction with the toothed wheel 21 or be separate from the latter.

The toothed wheel 21 and the clutch 22 are arranged in a downwards-facing opening 36 in the base table part 8. The transmission, rack 13-pinion 14-toothed wheel 21-transporting guide bar 15, is so selected that the displacement of the transporting guide bar 15 is more than the required displacement of the pallet 10 or 11. This therefore strikes, because of the positive guideway, against appropriately-arranged pallet abutments 30 on the base table part 8 and at 30' on the base frame 9. As a result of the appropriately greater adjustment travel of the transporting guide bar 15, when the abutments 30 and 30' are reached the clutch 22 is disengaged thus ensuring application against the abutments 30, 30' without need for exact programming and holding of the required end positions of the pallets 10 and 11. Despite large tolerances an accurate and exact end positioning of the pallets 10, 11 can in each case be achieved.

FIG. 6 illustrates further details and in particular the machine tool 1 with a tool 27 a vertically movable standard 28. Also to be seen are the base table part 8 with the transporting guide bar 15 seated at the lower part of the base table part 8. Above the transport guide bar 15 a pallet abutment 30 is located on the base table part 8 at its end 29 and this is connected through a switch 31 with a compressed air feed 32 which operates a press switch 31 with a compressed air feed 32 which operates with a reproducable switching accuracy of at least 0.05 mm (FIG. 7). Should the limit positions of the pallets 10, 11 on the base table part 8 not be reached because of any dirt or control fault, to prevent any damage to the tools the clutch 22, which is in the form of a clipping clutch, will be disengaged. During the machining of a workpiece the clutch 22 is always open so that a displacement of the base table part 8 relatively to the base table 4 is possible without any relative movement of the pallet 10 on the base table part 8.

Should the pallet 10 or 11 not reach the pallet abutment 30 or should there be too great a spacing between the pallet and the pallet abutment, the machine will be stopped through the press switch 31, this to prevent workpiece or tool damage because of improper positioning of the workpiece. At the front end of the transporting guide bar 15 facing the workpiece feed means 2 the guide 16 is formed by a groove in which can slide the guide dog 17 of the pallet 10 or 11, thus enabling the transporting guide bar 15 to be coupled or uncoupled with or from the pallet 10 or 11. In the construction illustrated there is a closed positive coupling of one of the pallets 10 or 11 with the transporting guide bar 15. By shifting the base table 4 with all its superstructure in the X-direction 7 either the pallet 10 (FIG. 1) or the pallet 11 (FIG. 4) may be coupled to the transporting guide bar 15 by appropriate choice through the NC-control system.

When the transporting guide bar 15 is moved in the X-direction 7 the pallet 10 is drawn on to the co-ordinating table 6, and the end of the transporting guide bar 15 can enter a tubular receiving socket 40 firmly arranged on the base table part 8. In contrast the rack 13 is firmly mounted on the base table 4 so that when the base table part 8 is shifted the pinion 14 can roll thereover. The actual drive for the base table part 8 is not shown in the embodiment illustrated, but it is controlled through the NC-control system and brings about the movement of the pallets 10 and 11 indirectly through the positive drive gear 12.

This movement is produced by the rolling of the pinion 14 on the rack 13 and converted by a predetermined tooth ratio between the pinion 14 and the toothed wheel 21, for example in the ratio 1:4. As a result the pallet 10 can be brought on to the co-ordinating table 6 with a relatively short travel in the X-direction (about 250 mm). After the clamped position (pallet abutment 30) is reached the pallet 10 is hydraulically clamped and the clutch 22 disengaged. The machining of the workpiece in an appropriate position can now be commenced. After machining, the pallet 10 passes on to the base frame 9, the co-ordinating table 6 moves back into the starting position and takes over, with the transporting guide bar 15 which now moves to a pallet 10 loaded with a fresh workpiece, until finally the pallet 10 abuts against the base table part 8 and the procedures related above start again.

The base frame 9 can be reproduced in mirror-image fashion at the other side of the machine tool 1. It also lies within the scope of the invention not to transfer the pallets in the X-direction 7 but in the Y-direction 5, and this creates no problem in the programming of the NC-control system.

In the embodiment illustrated in FIG. 9 not only two pallets 10 and 11 are provided on the base frame 9 but further pallets 10a to 10e and 11a to 11e. They can be moved in a U-shaped circulation path, the pallet 10 for example being loaded with machined workpieces and the pallets 10a to 10e, 11a to 11e with rough workpieces still to be machined. The pallets 11, 11a to 11e and 10e to 10a are then called from the co-ordinating table 6 in the manner described above in succession to the site 11 for machining and, after machining, back again to the base frame 9 (site 10). During the machining at the machine tool 1 the pallets 10, 11 remaining on the base frame 9 are moved stepwise by means of suitable drive means in the counterclockwise direction into the next position so that the site 10 for reception of a pallet with machined parts is always free and the next pallet with a rough workpiece always stands ready at site 11 to be called. The complete base frame 9 with the pallets 10 and 11 may then be part of a transfer run or merely an intermediate station for optimum exploitation of the machine tool 1. A plurality of machine tools 1 can be arranged on an enlarged frame 9 of this nature as a transfer run to cater for different machining steps which cannot be performed by one machine tool 1 alone. A machine tool 1, if the number of pallets 10 and 11 is adequate, can operate without operatives, as a result of which a lengthening of shifts can be accomplished to a considerable degree without using extra personnel (production with limited manning).

We claim:

1. In a machine assembly comprising a machine tool having a machining table for presenting work to said tool, said machining table comprising a base table reciprocably movable in the Y-direction and a co-ordinating table movable on said base table in the X-direction, the movements of said base table and said co-ordinating table being governed by an NC-control system, said assembly further comprising means for feeding work to said machine tool, the improvement wherein a base table part is arranged on the co-ordinating table immovable relatively to the latter, work feeding means are provided in the form of pallets on a base frame adjacent said machine tool and are movable to and from said base frame or said co-ordinating table in correlation with the movement of the base table relatively to the co-ordinating table, when located on the co-ordinating table the pallet is in horizontal alignment and abutting relationship with said bast table part, at least two of said pallets have surfaces which are at the same height as the surface of said base table part and together with the surface of said base table part form machining surfaces, at least the machining surfaces of the pallets are uniplanar, and said base table, said co-ordinating table with said base table part and one of said pallets are connected to one another selectively by the NC-control system through a positive drive gear, so that the movement of the pallet is carried out positively under the action of movement of said coordinating table or said base table.

2. A machine assembly according to claim 1, in which one of the pallets is subjected to a positive movement, through said positive drive gear, in response to a controlled movement of said co-ordinating table.

3. A machine assembly according to claim 1, in which the displacement travel and the speed of displacement of the pallet(s) relatively to the co-ordinating table is greater than the displacement travel and the rate of displacement of the co-ordinating table relatively to the base table.

4. A machine assembly according to claim 2, in which said positive drive gear includes a safety clutch.

5. A machine assembly according to claim 2, in which the positive drive gear comprises a rack fixed on said base table, a pinion mounted in said co-ordinating table and meshing in said rack, a transporting guide bar, a toothed wheel operatively connected to said pinion, and a clutch meshing with said guide bar and connected to said pinion.

6. A machine assembly according to claim 1, comprising a transporting guide bar movably mounted on said base table for transferring a pallet from said base frame to the co-ordinating table and shifting said pallet or said table, and comprising means for operating said guide bar including a toothed wheel, a clutch engaging said toothed wheel, a pinion connected to said clutch, and a fixed toothed rack run over by said pinion.

7. A machine assembly according to claim 1, including a positive drive gear for moving said pallets relatively to the base table, abutments on said pallets for correcting overtravel of the same on the base table and co-ordinating table, and a slipping clutch protecting said drive gear from damage due to such overtravel.

8. A machine assembly according to claim 7, comprising a releasable connection between said positive drive gear and the pallets, such connection comprising a grooved guideway to said gear co-operating with a guide dog on said pallets.

9. A machine assembly according to claim 1, in which the means for feeding work to said machine tool comprises a circulating track accommodating a multiplicity of replaceable pallets, means for moving pallets stepwise along said track, and means for selectively removing pallets loaded with unfinished workpieces from said track, and returning pallets loaded with finished machined workpieces to said track.

10. In a machine assembly comprising a machine tool having a machining table for presenting work to said tool, said machining table comprising a base table reciprocably movable in the Y-direction and a co-ordinating table movable on said base table in the X-direction, the movements of said base table and said co-ordinating table being governed by an NC-control system, said assembly further comprising means for feeding work to said machine tool, the improvement wherein a base table part is arranged on the co-ordinating table, work feeding means are provided in the form of pallets on a base frame adjacent said machine tool and are movable to and from said base frame or said co-ordinating table in correlation with the movement of the base table relatively to the co-ordinating table, when located on the co-ordinating table the pallet is in horizontal alignment and abutting relationship with said bast table part, at least two of said pallets have surfaces which, together with the surface of said base table part, form machining surfaces, at least the machining surfaces of the pallets are uniplanar, the base table part is provided with an abutment for the pallets and a compressed air nozzle directed against said abutment to remove contamination therefrom, and an electrical press switch is used to supervise the position of the pallets on the base table part in response to back pressure created by impact of pallets on said abutment.

11. In a machine assembly comprising a machine tool having a machining table for presenting work to said tool, said machining table comprising a base table reciprocably movable in the Y-direction and a co-ordinating table movable on said base table in the X-direction, the movements of said base table and said co-ordinating table being governed by an NC-control system, said assembly further comprising means for feeding work to said machine tool, the improvement wherein a part of the base table is arranged on the co-ordinating table, work feeding means are provided in the form of pallets on a base frame adjacent said machine tool and are movable to and from said base frame or said co-ordinating table in correlation with the movement of the base table relatively to the co-ordinating table, when located on the co-ordinating table the pallet is in horizontal alignment and abutting relationship with said bast table part, at least two of said pallets have surfaces which, together with the surface of said base table part, form machining surfaces, at least the machining surfaces of the pallets are uniplanar, a positive drive gear is provided for moving said pallets relatively to the base table, and the end of the base table part facing oncoming pallets is provided with an abutment for a contact switch controlling the drive to the operating parts of said assembly, contact with said switch being made in response to inadequate approach of said pallets thereby to disconnect said drive gear.

* * * * *